United States Patent
Homewood et al.

(10) Patent No.: US 11,158,309 B1
(45) Date of Patent: *Oct. 26, 2021

(54) AUTOMATIC DISTRIBUTION OF VALIDATED USER SAFETY ALERTS FROM NETWORKED COMPUTING DEVICES

(71) Applicant: Wells Fargo Bank, N.A., San Francisco, CA (US)

(72) Inventors: Rita M. Homewood, Tempe, AZ (US); Christopher M. Ruiz, San Francisco, CA (US); Scott Christopher Hall, Mesa, AZ (US); Michael J. Foster, Gilbert, AZ (US); Michelle E. Masters, Mesa, AZ (US); Lawrence R. Belton, Jr., Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 75 days.

This patent is subject to a terminal disclaimer.

(21) Appl. No.: 16/543,021

(22) Filed: Aug. 16, 2019

Related U.S. Application Data (63) Continuation of application No. 15/673,172, filed on Aug. 9, 2017, now Pat. No. 10,403,270.

(51) Int. Cl.
*G08B 23/00* (2006.01)
*G10L 15/18* (2013.01)
(Continued)

(52) U.S. Cl.
CPC ........ *G10L 15/1822* (2013.01); *G06Q 10/109* (2013.01); *G06Q 50/10* (2013.01); *G10L 15/183* (2013.01); *G06F 2203/0381* (2013.01)

(58) Field of Classification Search
CPC .. G10L 15/1822; G06Q 10/109; G06Q 50/10; G01L 15/183; G06F 2203/0381
See application file for complete search history.

(56) References Cited

U.S. PATENT DOCUMENTS

| 7,587,365 B2 | 9/2009 | Malik et al. |
| 7,742,961 B2 | 6/2010 | Aaron et al. |

(Continued)

OTHER PUBLICATIONS

"Crisis Response," accessed from https://www.facebook.com/about/crisisresponse/ on Nov. 15, 2017, 2 pp.

(Continued)

*Primary Examiner* — Phung Nguyen
(74) *Attorney, Agent, or Firm* — Shumaker & Sieffert, P.A.

(57) ABSTRACT

Techniques are described for automatically distributing validated user safety alerts from a networked computing device. The networked computing device may be configured to operate as an autonomous agent to perform actions on behalf of a user without receiving direct instructions from the user. For example, the autonomous agent computing device may be configured to make certain purchases, send alerts or reminders, or perform other functions in accordance with preprogrammed rules. According to the disclosed techniques, the autonomous agent computing device is configured to automatically generate and send an alert to one or more computing devices associated with the user upon detecting a safety concern for the user. The autonomous agent also uses a signing key associated with its digital certificate, which verifies the identity of the autonomous agent, to sign the alert such that a third-party server may validate the alert prior to distribution to the destination computing devices.

19 Claims, 6 Drawing Sheets

(51) Int. Cl.
  *G10L 15/183* (2013.01)
  *G06Q 50/10* (2012.01)
  *G06Q 10/10* (2012.01)

(56) References Cited

U.S. PATENT DOCUMENTS

| | | | |
|---|---|---|---|
| 10,403,270 | B1 | 9/2019 | Homewood et al. |
| 2008/0294891 | A1* | 11/2008 | Ram OV ............ H04W 12/069 |
| | | | 713/158 |
| 2010/0184509 | A1* | 7/2010 | Sylla .................... H04L 9/3268 |
| | | | 463/29 |
| 2012/0323717 | A1* | 12/2012 | Kirsch .................... G06F 21/31 |
| | | | 705/26.1 |
| 2015/0106621 | A1 | 4/2015 | Burke |
| 2015/0309492 | A1 | 10/2015 | Patel et al. |
| 2015/0379463 | A1 | 12/2015 | Sarangi |
| 2016/0140526 | A1 | 5/2016 | Cummins et al. |
| 2016/0171180 | A1 | 6/2016 | Yagnyamurthy et al. |
| 2016/0195864 | A1 | 7/2016 | Kim |
| 2016/0248847 | A1 | 8/2016 | Saxena et al. |
| 2016/0292773 | A1 | 10/2016 | Martin |
| 2017/0186112 | A1 | 6/2017 | Polapala |
| 2018/0075747 | A1 | 3/2018 | Pahwa |

OTHER PUBLICATIONS

Timuri et al., "Automatic Rule Ordering for Dynamic Scripting," Proceedings of the Third AAAI Conference on Artificial Intelligence and Interactive Digital Entertainment, Jun. 6-8, 2007, 6 pp.
Notice of Allowance from U.S. Appl. No. 15/673,172 dated Apr. 24, 2019, 10 pp.

\* cited by examiner

AUTOMATIC DISTRIBUTION OF VALIDATED USER SAFETY ALERTS FROM NETWORKED COMPUTING DEVICES

This application is a continuation of U.S. application Ser. No. 15/673,172, filed Aug. 9, 2017, now U.S. Pat. No. 10,403,270 issued on Sep. 3, 2019, the contents of this application are hereby incorporated by reference in their entirety.

TECHNICAL FIELD

The disclosure relates to networked computing devices.

BACKGROUND

A network may include a variety of disparate devices. For example, a home network may include a wide variety of devices such as personal computing devices including desktop computers, laptop computers, tablet computers, gaming devices, and so-called "smart" phones, "smart" pads, "smart" watches. In addition, at least one virtual personal assistant device may be connected to the home network. In some examples, the virtual personal assistant device may be a stand-alone device, e.g., a speaker, configured to perform a variety of personal and business tasks in response to user commands. In other examples, one of the personal computing devices may be configured to operate as the virtual personal assistant device. In order to perform personal and business tasks, the virtual personal assistant device may have access to a user's calendar, messaging accounts (e.g., email, voicemail, text, and chat), social media accounts, and bank accounts, and may also be configured to track the user's location and learn the user's typical behavior over time.

SUMMARY

In general, this disclosure describes techniques for automatically distributing validated user safety alerts from a networked computing device. The networked computing device may be configured to operate as an autonomous agent to perform actions on behalf of a user without receiving direct instructions from the user. For example, the autonomous agent computing device may be configured to make certain purchases, send alerts or reminders, or perform other functions in accordance with preprogrammed rules. According to the techniques of this disclosure, the autonomous agent computing device is configured to automatically generate and send an alert to one or more computing devices associated with the user and/or the user's contacts upon detecting a safety concern for the user. The autonomous agent also uses a signing key associated with its digital certificate, which verifies the identity of the autonomous agent, to digitally sign the alert such that a third-party server may validate the alert prior to distribution to the destination computing devices.

In one example, this disclosure is directed to an autonomous agent computing device comprising a memory configured to store a digital certificate that verifies an identity of the autonomous agent computing device, and one or more processors in communication with the memory. The one or more processors of the autonomous agent are configured to track information related to a user's location and behavior, detect a safety concern for the user based on the tracked information, generate an alert regarding the detected safety concern, and send the alert destined for one or more computing devices associated with the user, wherein the alert is signed using a signing key associated with the digital certificate of the autonomous agent computing device.

In another example, this disclosure is directed to a computer-based method comprising storing, by an autonomous agent computing device, a digital certificate that verifies an identity of the autonomous agent computing device, tracking, by the autonomous agent computing device, information related to a user's location and behavior, detecting, by the autonomous agent computing device, a safety concern for the user based on the tracked information, generating, by the autonomous agent computing device, an alert regarding the detected safety concern, and sending, by the autonomous agent computing device, the alert destined for one or more computing devices associated with the user, wherein the alert is signed using a signing key associated with the digital certificate of the autonomous agent computing device.

In a further example, this disclosure is directed to a system comprising an autonomous agent computing device configured to detect a safety concern for a user of the autonomous agent computing device, generate an alert regarding the detected safety concern, and send the alert destined for one or more computing devices associated with the user, wherein the alert is signed using a signing key associated with a digital certificate that verifies an identity of the autonomous agent computing device. The system further comprises a third-party server configured to validate the alert based on a signature of the alert and the digital certificate of the autonomous agent computing device, and send a notification of the validated alert approving use of the validated alert by the one or more computing devices associated with the user, and the one or more computing devices associated with the user configured to receive and present the validated alert.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
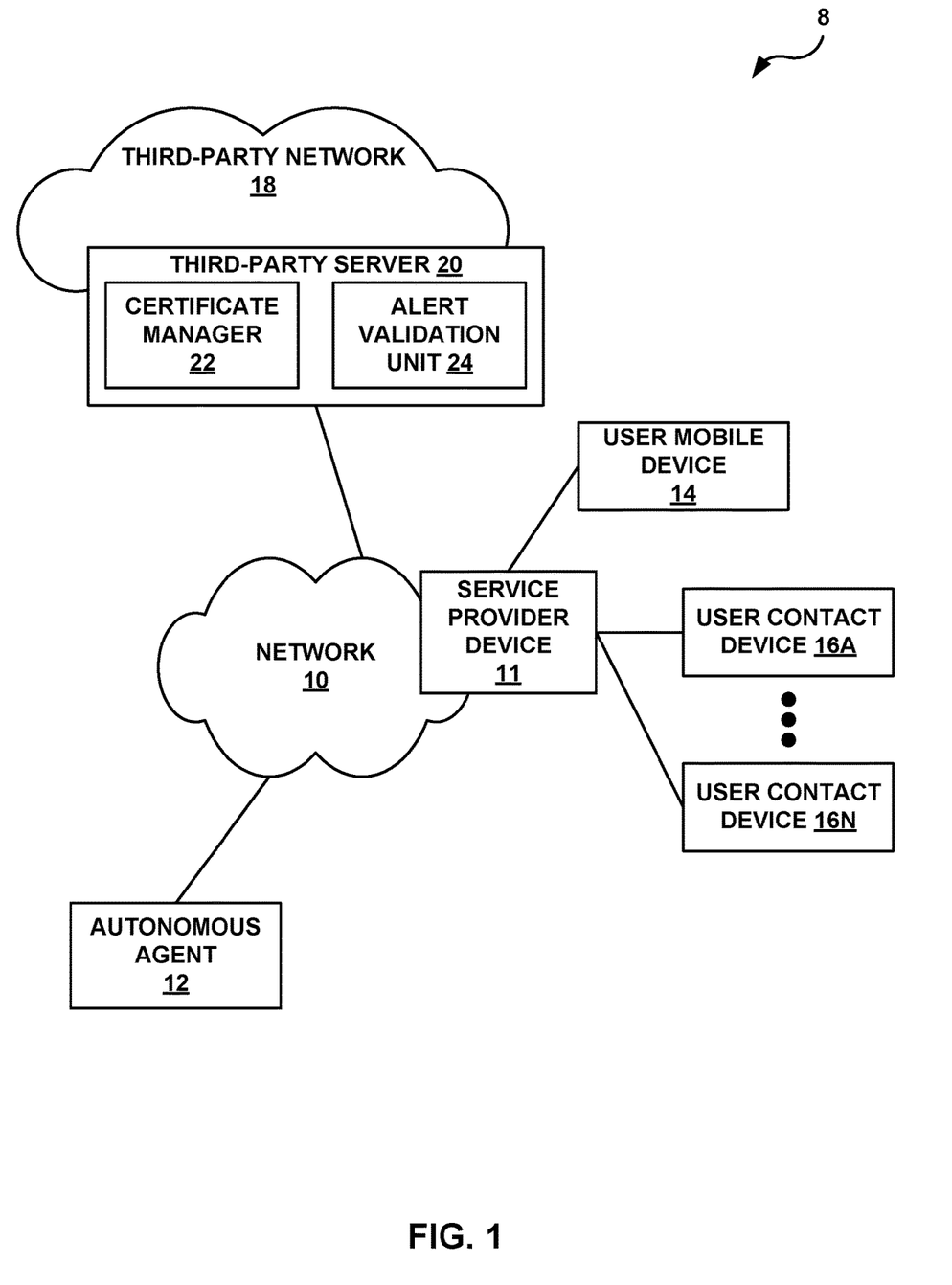
FIG. 1 is a block diagram illustrating an example network system including an autonomous agent and a third-party server configured to distribute a validated user safety alert, in accordance with the techniques of this disclosure.

FIG. 1 is a block diagram illustrating an example network system 8 including an autonomous agent 12 and a third-party server 20 configured to distribute a validated user safety alert, in accordance with the techniques of this disclosure. As illustrated in FIG. 1, network system 8 includes autonomous agent computing device 12 that is in communication with one or more user computing devices and third-party server 20 via network 10. The user computing devices include a user mobile device 14 and a plurality of user contact devices 16A-16N ("user contact devices 16"). Network system 8 also includes third-party server 20 of a third-party network 18 that is in communication with autonomous agent 12 via network 10.

Network 10 may comprise a private network or public network, such as the Internet. Although illustrated as a single entity, network 10 may comprise a combination of two or more public and/or private networks. Network 10 may comprise one or more of a wide area network (WAN) (e.g., the Internet), a local area network (LAN), a virtual private network (VPN), or another wired or wireless communication network. In some examples, network 10 may be a service provider network coupled to one or more networks administered by other providers, and may thus form part of a large-scale public network infrastructure, e.g., the Internet. Service provider device 11 may comprise a server or other network device of the service provider network associated with one or more of user mobile device 14 and user contact devices 16. For example, a user of user mobile device 14 may subscribe to Internet or mobile phone services through a certain service provider. Users of user contact devices 16 may subscribe to Internet or mobile phone services through the same or a different service provider. Service provider device 11 of the associated service may be responsible for distributing communications, e.g., alerts generated by autonomous agent 12, to one or more of user computing devices 14, 16.

User mobile device 14 may comprise any of a wide range of mobile user devices, including so-called "smart" phones, "smart" pads, "smart" watches, or other personal digital appliances equipped for wireless communication. User mobile device 14 may be associated with the user of autonomous agent 12. For example, user mobile device 14 may comprise the user's phone or a wearable device that is generally carried by the user. User mobile device 14 may include at least one user interface device (not shown) that enables the user to interact with user mobile device 14. In some examples, the user interface device of user mobile device 14 may be configured to output content such as a graphical user interface (GUI) for display, e.g., at a display device associated with user mobile device 14. In addition, the user interface device of user mobile device 14 may be configured to receive tactile, audio, or visual input.

User contact devices 16 may each comprise any of a wide range of user devices, including laptop or desktop computers, tablet computers, so-called "smart" phones, "smart" pads, or other personal digital appliances equipped for wired or wireless communication. User contact devices 16 may be associated with one or more contacts, e.g., friends, family, or colleagues, of the user of autonomous agent 12. For example, user contact devices 16 may each comprise a phone or a wearable device that is generally carried by a given contact of the user. In some examples, each of user contact device 16 may also include at least one user interface device that enables a user to interact with their respective one of user contact devices 16.

Autonomous agent computing device 12 may comprise a networked computing device within a private network, e.g., a wired or wireless network within a user's home. For example, a home network may include a wide variety of devices such as personal computing devices including desktop computers, laptop computers, tablet computers, gaming devices, and so-called "smart" phones, "smart" pads, "smart" watches. In addition, at least one virtual personal assistant device may be connected to the home network and configured to operate as autonomous agent 12 to perform actions on behalf of the user without receiving direct instructions from the user. In some examples, autonomous agent 12 may be a stand-alone device, e.g., a speaker, configured to perform a variety of personal and business tasks either autonomously or in response to user commands. In other examples, one of the personal computing devices may be configured to operate as autonomous agent 12.

In order to perform personal and business tasks, autonomous agent 12 may have access to a user's calendar, messaging accounts (e.g., email, voicemail, text, and chat), social media accounts, and bank accounts. In some examples, autonomous agent 12 may also have access to one or more networks associated with the user, e.g., the user's employer network or the user's bank network. Autonomous agent 12 may also be paired or associated with one or more of the other personal computing devices associated with the user, e.g., user mobile device 14. In this way, even if autonomous agent 12 is a wired or stationary device in the user's home network, autonomous agent 12 may be able to track the user's location based on periodic global positioning system (GPS) updates received from user mobile device 14. Moreover, autonomous agent 12 may be configured to aggregate and track all the gathered information to learn the user's typical behavior over time. For purposes of this disclosure, it may be assumed that the sources of input to autonomous agent 12 are secure and trusted. In other examples, autonomous agent 14 may need to validate the sources of input described herein prior to accepting and/or relying on any data received from these sources.

As described above, autonomous agent 12 may be configured to operate autonomously without receiving direct instructions from the user. For example, autonomous agent 12 may be configured to make certain purchases, send alerts or reminders, or perform other functions in accordance with preprogrammed rules. Moreover, autonomous agent 12 may be configured to automatically modify these preprogrammed rules based on detected factors. In some cases, the factors may be related to automatic purchases of goods and/or services. In other cases, the factors may be related to automatic performance of protection and/or security functions.

The following are several examples in the case of automatically adjusting purchasing rules of autonomous agent 12 for goods and/or services. As a first example, autonomous agent 12 may automatically adjust rules or parameters for purchases based on monitoring financial transactions versus the user's budget. In this example, any budget-based changes to the purchase rules made by autonomous agent 12 may be informed by priority preferences preset by the user. As a second example, autonomous agent 12 may automatically prioritize financial transactions based on available funds. For example, autonomous agent 12 may develop a user prioritization system based on tracked shopping habits of the user and assume real-time settlement at the bank to determine available funds in real time.

As a third example, autonomous agent 12 may automatically update purchase rules based on weather data and the likelihood that shipments or deliveries will be unavailability for a period of time (e.g., predictive ordering). As a fourth example, autonomous agent 12 may be linked to an electronic shopping list connected to multiple Internet of Things (IoT) devices (e.g., "smart" appliances) in the user's home. In this example, autonomous agent 12 may be programmed to automatically reorder certain goods when running low based on feedback from the IoT devices, identify sales at favorite local stores (or remote stores during travel) based on purchasing history, and connect to online merchants to make purchases. As a fifth example, autonomous agent 12 may track coupons offered by manufacturers and/or retails, and use logic to automatically associate each item on the user's shopping list with a coupon upon entering a store, prior to arrival at the store, or automatically ordering online.

As a sixth example, autonomous agent 12 may automatically place current or future purchase orders based on a historical view of ordering, but not order more than a predetermined quantity. In this example, autonomous agent 12 may reject and cancel an order requested by an unauthorized user if the order is out of bounds (i.e., more than the predetermined quantity) and send an alert to the user for confirmation. In this way, autonomous agent 12 may prevent unauthorized users, e.g., children, from ordering unwanted, unnecessary, or inappropriate items.

As a seventh example, autonomous agent 12 may send alerts or notifications to the user mobile device 14 for items purchased or items that need to be purchased. As an eighth example, autonomous agent 12 may study purchase behavior of the user, analyze when a product was last purchased, and how often the product is purchased to create an alert for an out-of-ordinary purchase. Based on the analysis, autonomous agent 12 may freeze or pause a purchase determined to be out-of-ordinary. As a ninth example, autonomous agent 12 may provide the user with suggestions on what to buy or notifications when the user is low on certain products, and also provide the user with the best prices or deals currently available from trusted and/or approved sellers.

The following are several examples in the case of automatically adjusting functions of autonomous agent 12 for user protection and/or security. As a first example, autonomous agent 12 may learn the user's emotions by monitoring biometrics and/or body conditions through one or more wearable devices, and provide protection to the user based on detecting that the user is under duress during an attempted purchase (e.g., by blocking or adjusting the attempted purchase).

As a second example, autonomous agent 12 may determine whether the user is under the influence or not in a right state of mind, and adjust purchase rules based on the determination to prevent unwanted purchases and protect the user's finances. In this example, the alternate or adjusted rules may be preset by the user. As a third example, autonomous agent 12 may determine whether the user is under the influence or not in a right state of mind, and adjust functionality based on the determination to prevent the user from driving home, e.g., in the case where the user's vehicle is linked to user mobile device 14 or is an autonomous vehicle.

As a fourth example, in the case where the user has a gambling problem, autonomous agent 12 may block or otherwise prevent a certain amount of money in an account from being spent based on upcoming expenses. For example, if autonomous agent 12 learns from the user's bank account that the mortgage is due, autonomous agent 12 may prevent the user from spending the money needed for the mortgage payment. In this example, the upcoming expenses for which to preserve funds may be determined based on automatic or manual prioritization. As a fifth example, autonomous agent 12 may adjust financial account withdrawal and/or payment rules for kids that are also users of autonomous agent 12 to learn money management and financial systems. As a sixth example, autonomous agent 12 may use merchant scores (e.g., a safe score) to identify trusted merchants as a service to the user. In this example, autonomous agent 12 may detect a need for performance of a service and automatically order the service from the best rated service provider based on the merchant scores. The merchant scores may be customer facing or business facing.

As a seventh example, autonomous agent 12 may distribute an alert to the user or the user's family and friends upon determining that the user may be injured, sick, lost, or kidnapped based on location data from user mobile device 14 or another mobile or wearable device associated with the user. Autonomous agent 12 may compare a current geolocation of user mobile device 14 with an electronic calendar of the user and a typical behavior pattern of the user. For example, the comparison performed by autonomous agent 12 may be based on expected user travel dates and location, recent purchases using the user's bank account or credit cards, and user work badge in/out times via identity authentications. Based on this comparison, autonomous agent 12 may determine that the current geolocation of user mobile device 14 is different than expected.

If the user is "lost" for a predefined period of time or the activity on the user's financial accounts is significantly out of the ordinary, autonomous agent 12 may generate a user safety alert notifying the user and/or the user's friends and family of the potential safety concern and requesting confirmation that the user is safe. In this example, validation that the user safety alert is coming from a trustworthy source may be performed by third-party network 18, e.g., the user's bank. In this way, a bad actor may unable to fake a kidnapping of the user in order to extort money from the user's family and friends. This example is described in more detail throughout the disclosure.

As an eighth example, autonomous agent 12 may distribute an alert to the user, the user's family and friends or the authorities upon determining that the user is lost during an outdoor activity, e.g., hiking. In this example, autonomous agent 12 may periodically detect a geolocation of user mobile device 14 or another mobile or wearable device associated with the user, and maintain a record of each detected geolocation as a map of the user's movements over a period of time. In this way, autonomous agent 12 may store electronic "breadcrumbs" that track the user's movements. If the user is lost for a predefined period of time or if the user themselves requests assistance, autonomous agent 12 may generate a user safety alert for the user, the user's friends and family, and/or the authorities including the electronic breadcrumbs.

In some examples, if the user is lost, autonomous agent 12 may map different routes based on the stored electronic breadcrumbs to get the user home, and send the maps to the user, the user's family or friends, or the authorities. To ensure that the electronic breadcrumbs are not from a bad actor to lure the user or the user's family and friends into trap, e.g., to be robbed, third-party network 18 may first validate autonomous agent 12 before disseminating the electronic breadcrumbs to user mobile device 14, or the user's family and friends, or the authorities. This example is described in more detail throughout the disclosure.

As a ninth example, autonomous agent 12 may distribute an alert to the user, the user's family and friends or the authorities upon determining that the user is near an emergency situation caused by a natural disaster (e.g., an earthquake) or a non-natural disaster (e.g., a train accident). Autonomous agent 12 may compare a current geolocation of the user mobile device 14 or another mobile or wearable device associated with the user with an indicated geolocation of an ongoing emergency situation. Based on the comparison, autonomous agent 12 may determine that the current geolocation of user mobile device 14 is substantially similar to the geolocation of the emergency situation.

Autonomous agent 12 may use the location information along with news reports and social media reports to send a user safety alert to user mobile device 14 about what is happening, provide guidance to the user on how to get to a safe location, and/or ask the user if they are hurt and need an ambulance or other service ordered. Autonomous agent 12 may also send alerts to the user's family and friends, or the authorities reporting the user's location and/or status. This example is described in more detail throughout the disclosure.

According to the techniques of this disclosure, autonomous agent 12 is configured to automatically generate an alert upon detecting a safety concern for the user. The user safety alert may be similar to the alerts described in the seventh, eighth, and ninth examples of automatically adjusting functions of autonomous agent 12 for user protection and/or security described above. Autonomous agent 12 may be configured to send the alert to at least user mobile device 14 associated with the user of the autonomous agent 12. For example, in the case where autonomous agent 12 comprises a wired or stationary device in the user's home network, autonomous agent 12 may first send the user safety alert to user computing device 14 to request confirmation that the user is safe. The user safety alert generated by autonomous agent 12 may also offer assistance to the user and/or let the user know that help is on its way to the user's location.

Autonomous agent 12 may be further configured to send the user safety alert to one or more of user contact devices 16 to notify the user's contacts of the safety concern for the user and provide at least geolocation information of the user. In some examples, autonomous agent 12 may follow preprogrammed rules that identify one or more individuals to contact in certain scenarios. For example, one of the preprogrammed rules may identify the user's spouse or parents as contacts for any type of user safety alert. Another one of the preprogrammed rules may identify a user's friend with whom the user frequently goes hiking, for example, as a contact in a scenario where the user is lost or missing during a hike or other outdoor activity. In other examples, autonomous agent 12 may automatically determine which of the user's contacts to send the alert based on a frequency with which the user communicates with certain contacts, a "favorites" list maintained by the user in user mobile device 14 or another computing device associated with the user of autonomous agent 12, or emergency contact details stored with the user's employer, bank, or other network accessible to autonomous agent 12. In still other examples, autonomous agent 12 may be configured to send the alert directly to the police or other authority.

Service provider device 11 may initially receive the alert generated by autonomous agent 12 for distribution to the one or more user computing devices 14, 16. Prior to distributing the alert to the destination computing devices, however, service provider device 11 may request validation that the alert is coming from a trusted source. In other examples, user computing devices 14, 16, themselves may request validation that the alert is coming from a trusted source prior to accepting or processing the alert. This step of validating the alert may thwart fraudulent schemes in which the user or the user's contacts are asked to provide or confirm the location, personal information, or financial information of the user under the guise of a safety concern for the user.

To enable validation of alerts generated by autonomous agent 12, network system 8 may utilize a public key infrastructure (PKI). For example, in the illustrated example of FIG. 1, third-party network 18 may provide encryption key and digital certificate management services to enable encryption and digital signature capabilities by autonomous agent 12 and service provider device 11 or user computing devices 14, 16. In some examples, third-party network 18 may comprise a bank network and third-party server 20 may comprise a bank server.

In general, secure communications over a public computer network, e.g., the Internet, may be performed using encryption keys to provide confidential communications and digital certificates to verify identifies of the sending and/or receiving parties. For example, the Hypertext Transfer Protocol Secure (HTTPS) protocol for secure communication provides authentication of the website or web server with which the user device is communicating by verifying the web server's digital certificate. The digital certificate is issued by a certificate authority and certifies ownership of a public key, including information about the public key and the identity of the owner of the public key, e.g., the web server. The user's web browser may rely upon the digital certificate to verify the identity of the web server. The HTTPS protocol also provides bidirectional encryption of communications between the user's web browser and the web server. The user's web browser may use the web server's public key included in the digital certificate to encrypt communication that can only be decrypted and read with a paired private encryption key, which may be held by the web server.

According to the techniques of this disclosure, the PKI may be leveraged to provide third-party certification to user devices, e.g., autonomous agent 12. In this way, the techniques enable service provider device 11 and/or destination user computing devices 14, 16 to request validation of messages received from user devices, e.g., autonomous agent 12, to ensure that the source is trustworthy. For example, autonomous agent 12 may generate a public-private key pair to be used for signing/validation of alerts and, in some cases, encryption/decryption. Autonomous agent 12 may then communicate with certificate manager 22 to register with third-party network 18 and receive a digital certificate verifying the identify of autonomous agent 12. The digital certificate binds the identity of autonomous agent 12 to the public key of autonomous agent 12, and is digitally signed by certificate manager 22. An example of third-party network 18 and PKI management is described in more detail below with respect to FIG. 2.

Upon generating an alert regarding a detected safety concern for the user, autonomous agent 12 digitally signs the alert using its private signing key associated with its digital certificate, and sends the alert destined for one or more user computing devices 14, 16. Autonomous agent 12 may send its digital certificate, which includes its public key used to validate its digital signature, to service provider device 11 or the one or more user computing devices 14, 16 as part of a network session during which autonomous agent 12 sends the alert. Autonomous agent 12 need not necessarily communicate the digital certificate and the alert together in the same message. In some cases, autonomous agent 12 may receive a digital certificate from each of service provider device 11 and the one or more user computing devices 14, 16 as part of the network session. In that case, autonomous agent 12 may encrypt the user safety alert with a public encryption key associated with the digital certificate received from each of service provider device 11 and user computer devices 14, 16, and send the encrypted alert to each of the respective devices 11, 14, 16. As described above, upon receiving the user safety alert, service provider device 11 and/or destination user computing devices 14, 16 may request validation of the received alert from third-party network 18 to ensure that the alert is coming from a known, trusted source.

In response to the request, alert validation unit 24 of third-party server 20 validates the alert based on the digital signature of the alert and the public key associated with the digital certificate of autonomous agent 12. Alert validation unit 24 then sends a notification of the validated alert to either service provider device 11 or the one or more destination computing devices 14, 16 approving use of the verified alert by the destination computing devices 14, 16. In one example, alert validation unit 24 may send the notification of the validated alert to service provider device 11 approving further transmission of the validated alert to the one or more destination computing devices 14, 16. In another example, alert validation unit 24 may send the notification of the validated alert to the one or more destination computing devices 14, 16 approving presentation of the validated alert by the destination computing devices 14, 16.

In other examples, service provider device 11 or the one or more destination computing devices 14, 16 may themselves validate the alert without using alert validation unit 24 of third-party server 20. For example, service provider device 11 or the one or more destination computing devices 14, 16 may have a trust relationship with third-party server 20 such that they know the public key of certificate manger 22 of third-party server 20. In this way, service provider device 11 or the one or more destination computing devices 14, 16 may authenticate the digital certificate of autonomous agent 12, which is digitally signed by certificate manager 22, using the public key of certificate manager 22, and then validate the alert based on the digital signature of the alert and the public key associated with the authenticated digital certificate of autonomous agent 12.

Although described herein as primarily using PKI and digital certificates to verify the identity of autonomous agent 12 and, thus, validate alerts generated by autonomous agent 12, in other examples, network system 8 may apply other methods of authentication and authorization for the purpose of verifying the identity of autonomous agent 12. In some cases, autonomous agent 12 and/or third-party network 18 may leverage artificial intelligence (AI) capabilities to continually learn and update their security techniques. For example, autonomous agent 12 and/or third-party network 18 may automatically learn of next generation PKI schemes or other new validation schemes, and automatically implement such schemes to replace the use of PKI and digital certificates to validate alerts generated by autonomous agent 12.

The architecture of network system 8 illustrated in FIG. 1 is shown for exemplary purposes only and network system 8 should not be limited to this architecture. Network system 8 illustrated in FIG. 1 shows a single autonomous agent 12 in communication with an associated set of user computing devices 14, 16. In other examples, network system 8 may include multiple different autonomous agent computing devices and multiple different user computing devices associated with each of the different autonomous agents. In addition, network system 8 shows a single third-party network 18. In other examples, each of the autonomous agents included in network system 8 may be registered with the same or a different third-party network for identity verification.

Figure 2:
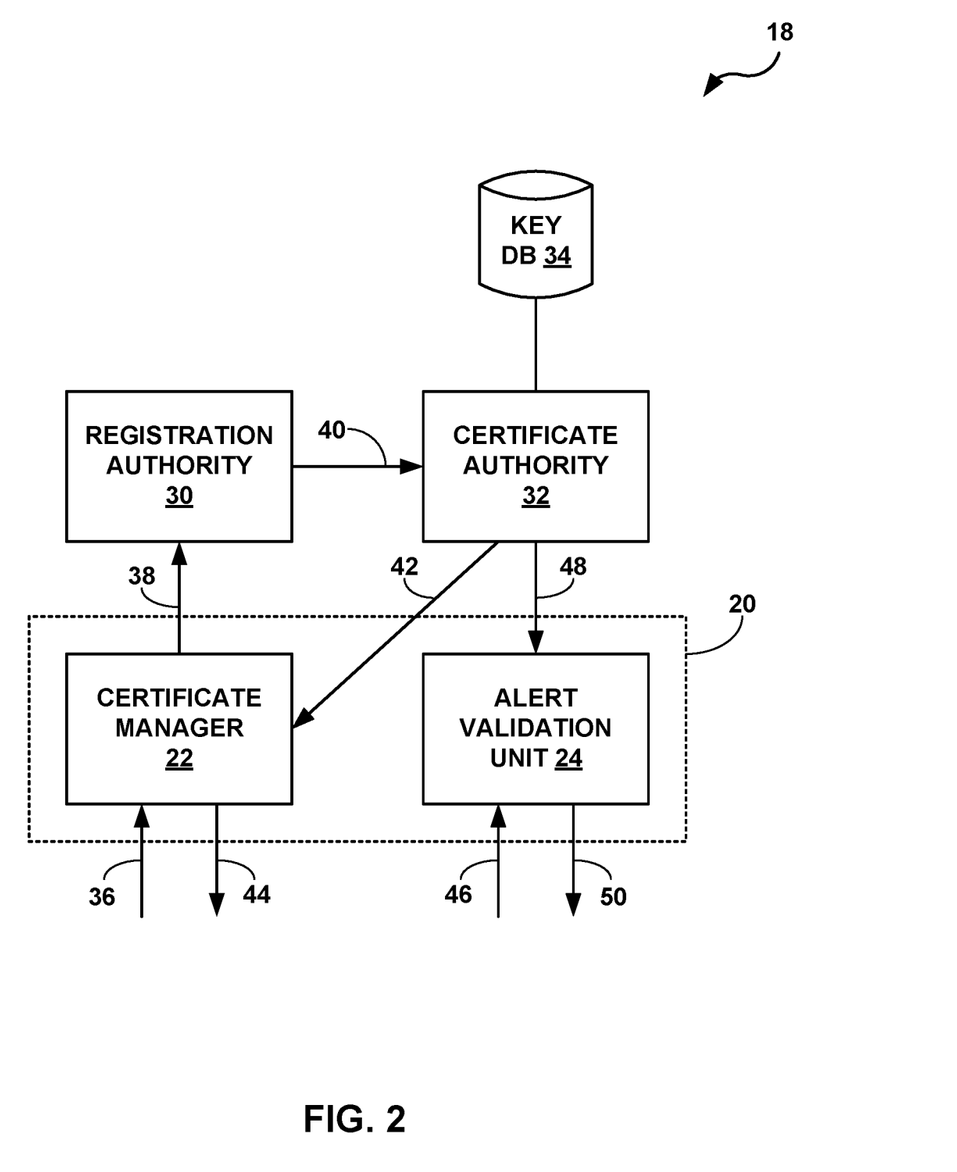
FIG. 2 is a conceptual diagram illustrating an example of the third-party network of FIG. 1 in greater detail.

FIG. 2 is a conceptual diagram illustrating an example of third-party network 18 of FIG. 1 in greater detail. As shown in FIG. 2, third-party network 18 includes third-party server 20 having certificate manager 22 and alert validation unit 24, as well as a registration authority 30, a certificate authority 32, and a key database 34. The architecture of third-party network 18 illustrated in FIG. 2 is shown for exemplary purposes only and third-party network 18 should not be limited to this architecture. In other examples, autonomous agent 60 may be configured in a variety of ways.

Initially, certificate manager 22 of third-party server 20 may receive a request 36 from autonomous agent 12 for a digital certificate. Prior to sending the request autonomous agent 12 generates a public-private key pair to be used for signing/validation. In some cases, the public-private key pair may also be used for encryption/decryption. The request for the digital certificate includes the name of autonomous agent 12 and the public key of the public-private key pair generated by autonomous agent 12. In response to the request, certificate manager 22 may facilitate the registration of autonomous agent 12 with third-party network 18. For example, certification manger 22 sends a request 38 to registration authority 30 for registration of autonomous agent 12. Registration authority 30 authenticates autonomous agent 12 based on information that may be included in the initial request 36 or subsequently requested or discovered. For example, registration authority 30 may authenticate autonomous agent 12 based on information about autonomous agent 12, e.g., a serial number of autonomous agent 12, a location of autonomous agent 12, and/or a network address of autonomous agent 12, and information about the user of autonomous agent 12, e.g., name, address and phone number of the user or a social security number of the user. In examples where third-party network 18 is the user's a bank network, third-party network 18 may authenticate autonomous agent 12 based the user's bank account number and login credentials including a user name and personal identification number (PIN) or password.

Once autonomous agent 12 is authenticated, registration authority 30 sends a request 40 to certificate authority 32 for issuance of a digital certificate for autonomous agent 12. In response, certificate authority 32 generates the digital certificate including the name of autonomous agent 12 and the public key associated with autonomous agent 12, and digital signs the digital certificate with its own digital signature, i.e., its private key. Certificate authority 32 then issues the digital certificate that binds the public key with the identity of autonomous agent 12. Certificate authority 32 stores the public key along with the digital certificate for autonomous agent 12 in key database 34. Certificate authority 32 then sends a communication 42 including the digital certificate for autonomous agent 12 back to certificate manager 22 of third-party server 20. Certificate manger 22, in turn, sends a communication 44 including the digital certificate to autonomous agent 12.

At a later time, alert validation unit 24 of third-party server 20 may receive a request 46 from one of user mobile device 14 or one of user contact devices 16 to validate an alert generated by autonomous agent 12. In response, alert validation unit 24 validates the alert based on the digital signature of the alert and the public key associated with the digital certificate of autonomous agent 12 stored in key database 34. Alert validation unit 24 also receives communication 48 from certificate authority 32 indicating whether the digital certificate for autonomous agent 12 has been revoked. Based on the digital certificate being included in key database 34 and not revoked, alert validation unit 24 may validate the alert. Alert validation unit 24 then sends a notification 50 of the validated alert to the one of user mobile device 14 or one of user contact devices 16 from which the validation request was originally received.

Figure 3:
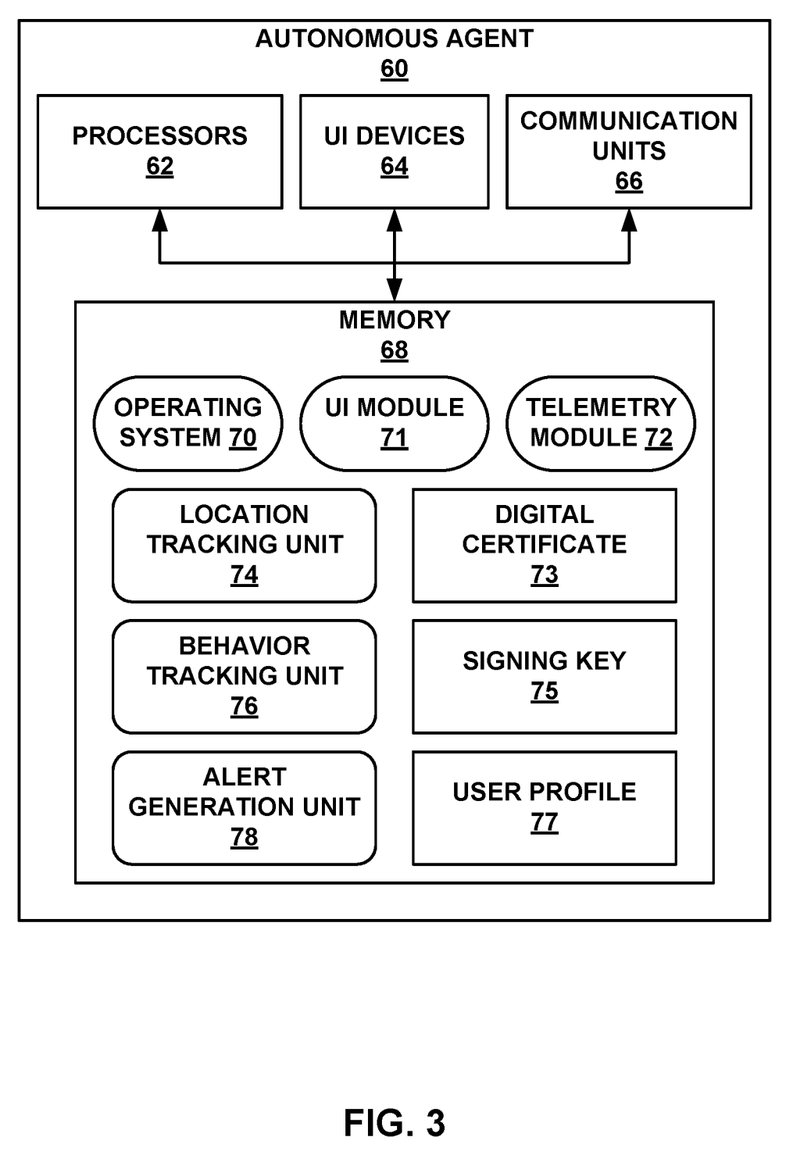
FIG. 3 is a block diagram illustrating an example autonomous agent computing device configured to automatically generate a user safety alert, in accordance with the techniques of this disclosure.

FIG. 3 is a block diagram illustrating an example autonomous agent computing device 60 configured to automatically generate a user safety alert, in accordance with the techniques of this disclosure. Autonomous agent computing device 60 may operate substantially similar to autonomous agent computing device 12 from FIG. 1. The architecture of autonomous agent 60 illustrated in FIG. 3 is shown for exemplary purposes only and autonomous agent 60 should not be limited to this architecture. In other examples, autonomous agent 60 may be configured in a variety of ways.

As shown in the example of FIG. 3, autonomous agent 60 includes one or more processors 62, one or more user interface (UI) devices 64, one or more communication units 66, and one or more memory units 68. Memory 68 of autonomous agent 60 includes operating system 70, UI module 71, telemetry module 72, location tracking unit 74, behavior tracking unit 76, and alert generation unit 78, which are executable by processors 62. Each of the components, units or modules of autonomous agent 60 are coupled (physically, communicatively, and/or operatively) using communication channels for inter-component communications. In some examples, the communication channels may include a system bus, a network connection, an inter-process communication data structure, or any other method for communicating data.

Processors 62, in one example, may comprise one or more processors that are configured to implement functionality and/or process instructions for execution within autonomous agent 60. For example, processors 62 may be capable of processing instructions stored by memory 68. Processors 62 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 68 may be configured to store information within autonomous agent 60 during operation. Memory 68 may include a computer-readable storage medium or computer-readable storage device. In some examples, memory 68 includes one or more of a short-term memory or a long-term memory. Memory 68 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory 68 is used to store program instructions for execution by processors 62. Memory 68 may be used by software or applications running on autonomous agent 60 (e.g., location tracking unit 74, behavior tracking unit 76, and alert generation unit 78) to temporarily store information during program execution.

Autonomous agent 60 may utilize communication units 66 to communicate with external devices via one or more networks, e.g., network 10 from FIG. 1. Communication units 66 may be network interfaces, such as Ethernet interfaces, optical transceivers, radio frequency (RF) transceivers, or any other type of devices that can send and receive information. Other examples of interfaces may include Wi-Fi, near-field communication (NFC), or Bluetooth® radios.

UI devices 64 may be configured to operate as both input devices and output devices. For example, UI devices 64 may be configured to receive tactile, audio, or visual input from a user of autonomous agent 60. In addition to receiving input from a user, UI devices 64 may be configured to provide output to a user using tactile, audio, or video stimuli. In one example, UI devices 64 may be configured to output content such as audio for output by one or more speakers, or a GUI for display at a display device. UI devices 64 may include a presence-sensitive display or touchpad that receives input from a user using capacitive, inductive, and/or optical detection at or near the presence sensitive display or touchpad.

Other examples of UI devices 64 include a mouse, a keyboard, a voice responsive system, video camera, microphone or any other type of device for detecting a command from a user, or a sound card, a video graphics adapter card, or any other type of device for converting a signal into an appropriate form understandable to humans or machines. Additional examples UI devices 64 include a speaker, a cathode ray tube (CRT) monitor, a liquid crystal display (LCD), organic light emitting diode (OLED), or any other type of device that can generate intelligible output to a user.

Operating system 70 controls the operation of components of autonomous agent 60. For example, operating system 70, in one example, facilitates the communication of UI module 71, telemetry module 72, location tracking unit 74, behavior tracking unit 76, and alert generation unit 78 with processors 62, UI devices 64, communication units 66, and memory 68. UI module 71, telemetry module 72, location tracking unit 74, behavior tracking unit 76, and alert generation unit 78 may each include program instructions and/or data stored in memory 68 that are executable by processors 62. For example, alert generation unit 78 may include instructions that cause autonomous agent 60 to perform one or more of the techniques described in this disclosure.

UI module 71 may be software and/or hardware configured to interact with one or more of UI devices 64. For example, UI module 71 may process audio or visual data to be output through one or more of UI devices 64. UI module 71 may also process input received from one or more of UI devices 64. Telemetry module 72 may be software and/or hardware configured to interact with communication units 66. Telemetry module 72 may process data packets for transmission via communication units 66. Telemetry module 72 may also process data packets received from communication units 66.

Autonomous agent 60 may include additional components that, for clarity, are not shown in FIG. 3. For example, autonomous agent 60 may include a battery to provide power to the components of autonomous agent 60. Similarly, the components of autonomous agent 60 shown in FIG. 3 may not be necessary in every example of autonomous agent 60.

According to the techniques described in this disclosure, autonomous agent 60 tracks information related to a user's location and behavior in order to detect a safety concern for the user. For example, autonomous agent 60 may use the tracked information to detect if the user is sick, injured, lost, kidnapped, or involved in a natural disaster, non-natural disaster, or other emergency situation.

Location tracking unit 74 of autonomous agent 60 tracks geolocation of a mobile computing device owned by the user, e.g., user mobile device 14 from FIG. 1, over time. For example, location tracking unit 74 may continuously detect a geolocation of the user based on GPS updates received from the user's mobile computing device. In this example, location tracking unit 74 may store and continuously update a current geolocation of the user. In other example, location tracking unit 74 may periodically detect a geolocation of the user based on requested GPU information received from the user's mobile computing device. In this example, location tracking unit 74 may store a record of each detected geolocation as a map of the user's movements over a period of time. In some cases, location tracking unit 74 may continually update and store maps of the user's movements in predefined intervals, e.g., each hour, each day. In other cases, location tracking unit 74 may store a map of the user's movements based on a request from the user or based on a determination that the user is participating in an outdoor activity for which tracking the user's movement may be useful.

Behavior tracking unit 76 of autonomous agent 60 may track financial transactions made by the user over time and/or identity authentications of the user over time. For example, behavior tracking unit 76 may detect purchases, money transfers, or other financial transactions performed using the user's bank account or credit cards. In some examples, behavior tracking unit 76 may detect the financial transactions based on feedback from a mobile wallet application executed on the user's mobile computing device, e.g., user mobile device 14 from FIG. 1, a mobile banking application executed on the user's mobile computing device, or direct access to the user's bank account and/or credit card accounts. Upon detecting a financial transaction, behavior tracking unit 76 may determine additional information about the financial transaction including the date, time, location, and amount associated with the financial transaction. Behavior tracking unit 76 may store records of the financial transactions along with the associated information over a period of time.

Behavior tracking unit 76 may also detect identity badge authorizations, website logins, or other identity authentications of the user. In some examples, behavior tracking unit 76 may detect the identity authentications based on feedback from the user's mobile computing device when used to authenticate the user, or feedback from one or more networks associated with the user, e.g., the user's employer network or the user's bank network. Upon detecting an identity authentication, behavior tracking unit 76 may determine additional information about the authentication including the date, time, and location of the authentication. Behavior tracking unit 76 may store records of the identity authentications along with the associated information over a period of time.

Based on the tracked information, autonomous agent 60 may generate and update a typical behavior pattern of the user stored in user profile 77. For example, user profile 77 may include a typical behavior pattern that indicates a typical time when the user leaves for work, a typical time when the user badges into work via an identity authentication, when and where the user typically goes to lunch based on geolocation and/or financial transactions, when and where the user typically goes grocery shopping and how much the user spends based on geolocation and/or financial transactions, a typical time when the user arrives home for the evening, and the like. In some examples, autonomous agent 60 may be associated with more than one user and store different profiles for each different user (e.g., each member of a household may have a different user profile 77 with autonomous agent 60). For purposes of this disclosure, it may be assumed that the data sources used by location tracking unit 74 and behavior tracking unit 76 are secure and trusted. In other examples, autonomous agent 60 may need to validate the data sources described herein prior to accepting and/or relying on any data received from these sources.

According to the techniques described in this disclosure, alert generation unit 78 of autonomous agent 60 detects a safety concern for the user based on the tracked information detected by location tracking unit 74 and behavior tracking unit 76. In addition, alert generation unit 78 may apply information learned from the user's calendar, messaging accounts (e.g., email, voicemail, text, and chat), social media accounts, and bank accounts to detect the safety concern. In some examples, alert generation unit 78 may also apply information learned from one or more networks associated with the user, e.g., the user's employer network or the user's bank network, to detect the safety concern.

For example, alert generation unit 78 may compare a current geolocation of the mobile computing device owned by the user, e.g., user mobile device 14 from FIG. 1, with an electronic calendar of the user and a typical behavior pattern of the user. Based on the comparison, alert generation unit 78 may determine that the current geolocation of the user's mobile computing device is different than expected based on the user's calendar and typical behavior pattern. In this way, alert generation unit 78 may determine that the user is potentially sick, injured, lost, or kidnapped. In response to this determination, alert generation unit 78 may generate a user safety alert to request confirmation that the user is safe. Alert generation unit 78 may also generate a user safety alert to provide at least the current geolocation of the user the user's friends and family. In some examples, alert generation unit 78 may also provide location or behavioral tracking information over the last few hours or days to the user's friends or family to assist in locating the user.

As another example, alert generation unit 78 may compare a current geolocation of the user's mobile computing device with an indicated geolocation of an ongoing emergency situation, e.g., a natural or non-natural disaster. Based on the comparison, alert generation unit 78 may determine that the current geolocation of the user's mobile computing device is substantially similar to the geolocation of the emergency situation. In this way, alert generation unit 78 may determine that the user is potentially trapped in or near the emergency situation and may be injured. In response to this determination, alert generation unit 78 may generate a user safety alert to request confirmation that the user is safe and provide assistance, e.g., instructions, directions, or emergency services, for the user to get out of the emergency area. Alert generation unit 78 may also generate a user safety alert to provide a current geolocation of the user and the user's status to the user's friends and family. In some examples, alert generation unit 78 may send a user safety alert directly to the police or another authority.

Alert generation unit 78 may generate user safety alerts as any of a "push" notification, an email, a text message, a simple messaging service (SMS) message, a multimedia messaging service (MMS) message, a chat message, a voice message, or the like. As described above, alert generation unit 78 may send the user safety alerts to computing devices owned by one or more of the user's family and friends, e.g., contact devices 16 from FIG. 1. In some examples, alert generation unit 78 may follow preprogrammed rules stored in user profile 77 that identify one or more individuals to contact in certain scenarios. For example, one of the preprogrammed rules may identify the user's spouse or parents as contacts for any type of user safety alert. Another one of the preprogrammed rules may identify a friend of the user that may typically participate with the user in certain outdoor activities, e.g., hiking. In other examples, alert generation unit 78 may automatically determine which of the user's family and friends to send the alert based on a frequency with which the user communicates with certain contacts, a "favorites" list stored in user profile 77 or in the user's mobile computing device, or emergency contact details stored with the user's employer, bank, or other network accessible to autonomous agent 60.

According to the disclosed techniques, alert generation unit 78 also digitally signs the user safety alert using a signing key 75 associated with digital certificate 73. Autonomous agent 60 may generate a public-private key pair to be used for signing/validation of alerts and, in some cases, encryption/decryption. Autonomous agent 60 stores the private key of the key pair as signing key 75. Autonomous agent 60 then uses the public key of the key pair to requests digital certificate 73 from a third-party network, e.g., third-party network 18 from FIG. 1, and, upon receipt, stores digital certificate 73. Digital certificate 73 binds the identity of autonomous agent 60 to the public key of autonomous agent 60. Alert generation unit 78 uses signing key 75 associated with digital certificate 73 to digitally sign the user safety alerts in order to enable the destination computing devices to validate the alerts to ensure that the alerts are generated by a known, trusted source. In some cases, alert generation unit 78 may also encrypt the user safety alerts prior to sending to the one or more destination computing devices. For example, alert generation unit 78 may encrypt the alerts using public encryption keys associated with digital certificates received from the one or more destination computing devices.

Figure 4:
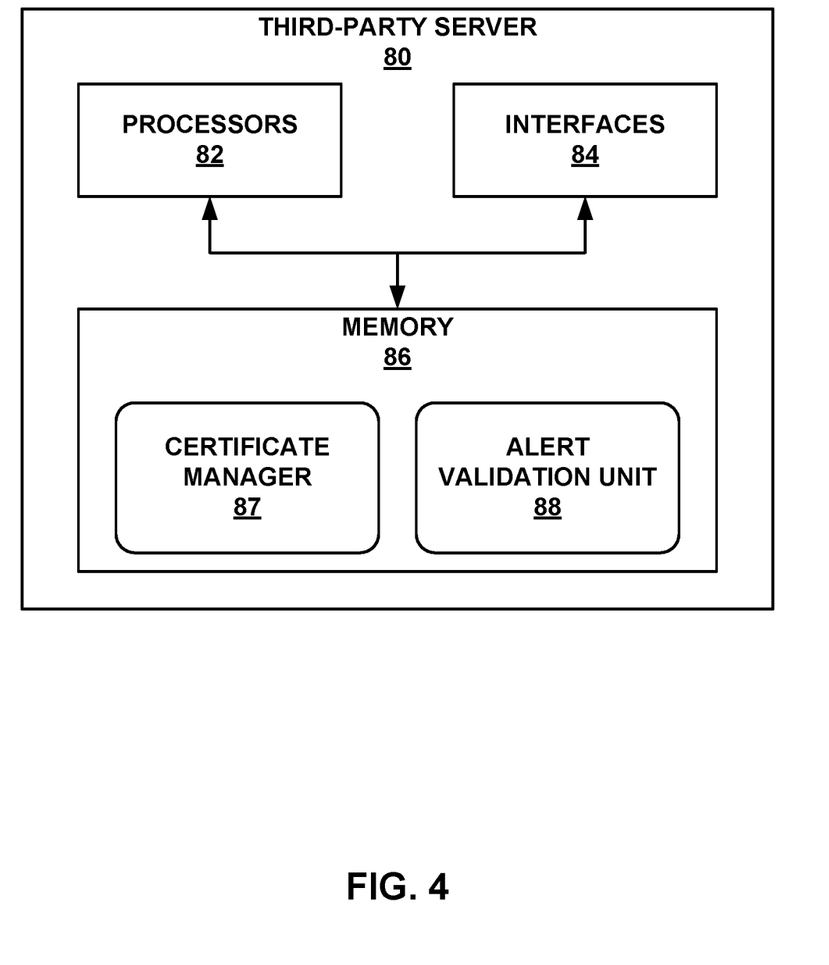
FIG. 4 is a block diagram illustrating an example third-party server device configured to validate a user safety alert from an autonomous agent, in accordance with the techniques of this disclosure.

FIG. 4 is a block diagram illustrating an example third-party server device 80 configured to validate a user safety alert from an autonomous agent, in accordance with the techniques of this disclosure. Third-party server device 80 may operate substantially similar to third-party server 20 from FIGS. 1 and 2. The architecture of third-party server 80 illustrated in FIG. 4 is shown for exemplary purposes only and third-party server 80 should not be limited to this architecture. In other examples, third-party server 80 may be configured in a variety of ways.

As shown in the example of FIG. 4, third-party server 80 includes one or more processors 82, one or more interfaces 84, and one or more memory units 86. Memory 86 of third-party server 80 includes certificate manager 87 and alert validation unit 88, which are executable by processors 82. Each of the components, units or modules of third-party server 80 are coupled (physically, communicatively, and/or operatively) using communication channels for inter-component communications. In some examples, the communication channels may include a system bus, a network connection, an inter-process communication data structure, or any other method for communicating data.

Processors 82, in one example, may comprise one or more processors that are configured to implement functionality and/or process instructions for execution within third-party server 80. For example, processors 82 may be capable of processing instructions stored by memory 86. Processors 82 may include, for example, microprocessors, DSPs, ASICs, FPGAs, or equivalent discrete or integrated logic circuitry, or a combination of any of the foregoing devices or circuitry.

Memory 86 may be configured to store information within third-party server 80 during operation. Memory 86 may include a computer-readable storage medium or computer-readable storage device. In some examples, memory 86 includes one or more of a short-term memory or a long-term memory. Memory 86 may include, for example, RAM, DRAM, SRAM, magnetic discs, optical discs, flash memories, or forms of EPROM or EEPROM. In some examples, memory 86 is used to store program instructions for execution by processors 82. Certificate manager 87 and alert validation unit 88 may each include program instructions and/or data stored in memory 86 that are executable by processors 82. Memory 86 may also be used by software or applications running on third-party server 80 (e.g., certificate manager 87 and alert validation unit 88) to temporarily store information during program execution.

Third-party server 80 may utilize interfaces 84 to communicate with external devices via one or more networks, e.g., network 10 from FIG. 1. Interfaces 84 may be network interfaces, such as Ethernet interfaces, optical transceivers, RF transceivers, or any other type of devices that can send and receive information. Other examples of interfaces may include Wi-Fi, NFC, or Bluetooth radios. In some examples, third-party server 80 utilizes interfaces 84 to communicate with an external device such as autonomous agent 12, service provider device 11, user mobile device 14, or one of contact devices 16 from FIG. 1.

Third-party server 80 may include additional components that, for clarity, are not shown in FIG. 4. For example, third-party server 80 may include a battery to provide power to the components of third-party server 80. As another example, third-party server 80 may include an operating system that controls the operation of components of third-party server 80. Similarly, the components of third-party server 80 shown in FIG. 4 may not be necessary in every example of third-party server 80.

According to the techniques described in this disclosure, third-party server 80 may facilitate issuance of a digital certificate for a user device, e.g., autonomous agent 12, and verification of alerts subsequently generated by the user device based on the digital certificate for the user device.

Certificate manager 87 may facilitate registration and issuance of the digital certificate for the user device. Certificate manager 87 may operate substantially similar to certificate manager 22 from FIGS. 1 and 2. For example, certificate manager 87 may authenticate the user device in response to a request including information identifying the user device and/or information identifying a user of the user device. Once the user device is authenticated, certificate manager 87 issues a digital certificate for the user device that verifies the identity of the user device and binds a public key to the identity of the user device. Certificate manager 87 also stores the digital certificate for the user device.

Alert validation unit 88 may facilitate verification of alerts generated by the user device. Alert validation unit 88 may operate substantially similar to alert validation unit 24 from FIGS. 1 and 2. For example, in response to a request, alert validation unit 88 may validate an alert generated by the user device based on the digital signature of the alert and the public key associated with the digital certificate of the user device. Alert validation unit 88 may verify that the digital signature of the alert matches the digital certificate for the user device stored by certificate manager 87 and that the digital certificate for the user device is not revoked. Alert validation unit 88 then sends a notification of the validated alert to one or more destination computing devices that originally requested the validation.

Figure 5:
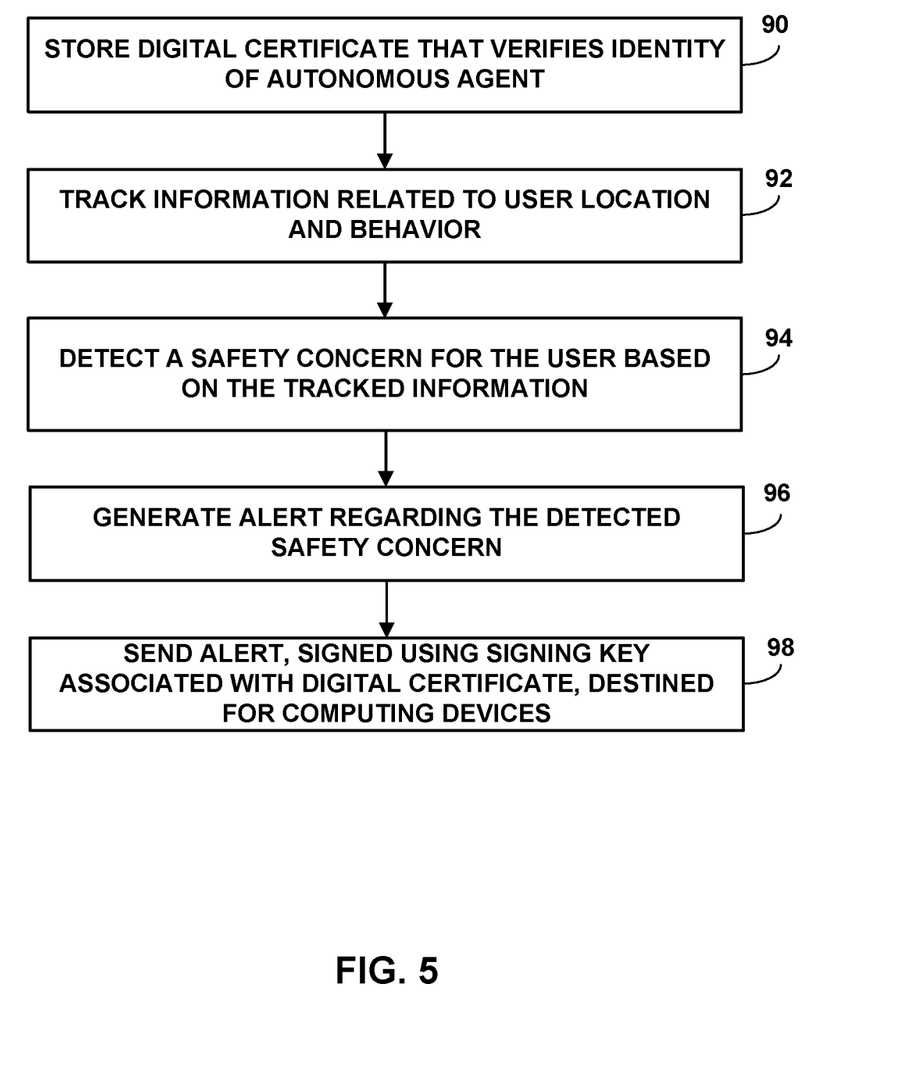
FIG. 5 is a flowchart illustrating an example operation of automatically generating a user safety alert, in accordance with the techniques of this disclosure

FIG. 5 is a flowchart illustrating an example operation of automatically generating a user safety alert, in accordance with the techniques of this disclosure. The example operation of FIG. 5 is described with respect to autonomous agent computing device 60 from FIG. 3. In other examples, the operation of FIG. 5 may also be performed by autonomous agent computing device 12 from FIG. 1.

Autonomous agent 60 stores a digital certificate 73 in memory 68 that verifies the identity of autonomous agent 60. For example, autonomous agent 12 may generate a public-private key pair to be used for signing/validation of alerts. Autonomous agent 12 stores the private key of the key pair as signing key 75. Autonomous agent 60 may then send a request for digital certificate 73 to a certificate manager associated with a third-party server, e.g., certificate manager 22 of third-party server 20 from FIG. 1. In response to the request, autonomous agent 12 receives digital certificate 73 from the certificate manager that includes the identity of autonomous agent 60 and the public key of the key pair.

Autonomous agent 60 tracks information related to a user's location and behavior (92). In some examples, location tracking unit 74 of autonomous agent 60 may track geolocation of a mobile computing device owned by the user, e.g., user mobile device 14 from FIG. 1, over time, and behavior tracking unit 76 of autonomous agent 60 may track financial transactions made by the user over time and/or identity authentications of the user over time. Based on the tracked information, autonomous agent 60 may generate a typical behavior pattern of the user, e.g., when the user leaves for work, when the user badges into work via an identity authentication, when and where the user goes to lunch based on geolocation and/or financial transactions, when the user goes to the grocery store and how much the user spends based on geolocation and/or financial transactions, and the like.

In other examples, location tracking unit 74 may periodically detect a geolocation of a mobile computing device owned by the user, e.g., user mobile device 14 from FIG. 1, and maintain a record of each detected geolocation as a map of the user's movements over a period of time. In some cases, location tracking unit 74 may continually update and store maps of the user's movements in predefined intervals, e.g., each hour, each day. In other cases, location tracking unit 74 may store a map of the user's movements based on an indication or determination that the user is going hiking or participating in some other outdoor activity with a risk of getting lost or hurt.

Alert generation unit 78 of autonomous agent 60 then detects a safety concern for the user based on the tracked information (94). For example, alert generation unit 78 may compare a current geolocation of the mobile computing device owned by the user, e.g., user mobile device 14 from FIG. 1, with an electronic calendar of the user and a typical behavior pattern of the user. Based on this comparison, alert generation unit 78 may determine that the current geolocation of the user's mobile computing device is different than expected based on the user's calendar and typical behavior pattern. As another example, alert generation unit 78 may compare a current geolocation of the user's mobile computing device with an indicated geolocation of an ongoing emergency situation. Based on the comparison, alert generation unit 78 may determine that the current geolocation of the user's mobile computing device is substantially similar to the geolocation of the emergency situation.

Upon detecting the safety concern for the user, alert generation unit 78 generates an alert regarding the detected safety concern (96). Alert generation unit 78 may generate the alert as any of a "push" notification, an email, a text message, a SMS message, a MMS message, a chat message, a voice message, or the like. Alert generation unit 78 also signs the alert using signing key 75 associated with digital certificate 73. In some cases, alert generation unit 78 may also encrypt the alert prior to sending to the one or more destination computing devices.

Autonomous agent 60 uses communication units 66 to send the alert, signed using signing key 75 associated with digital certificate 73, destined for one or more computing devices associated with the user (98). Autonomous agent 60 may send digital certificate 73 to the one or more computing devices prior to sending the alert destined for the one or more computing devices. For example, autonomous agent 60 may send the alert to the user's mobile computing device to request confirmation that the user is safe. Autonomous agent 60 may also send the alert to at least one computing device owned by a contact of the user, e.g., one of contact devices 16 from FIG. 1, to notify the user's contact of the safety concern for the user and provide at least geolocation information of the user.

Figure 6:
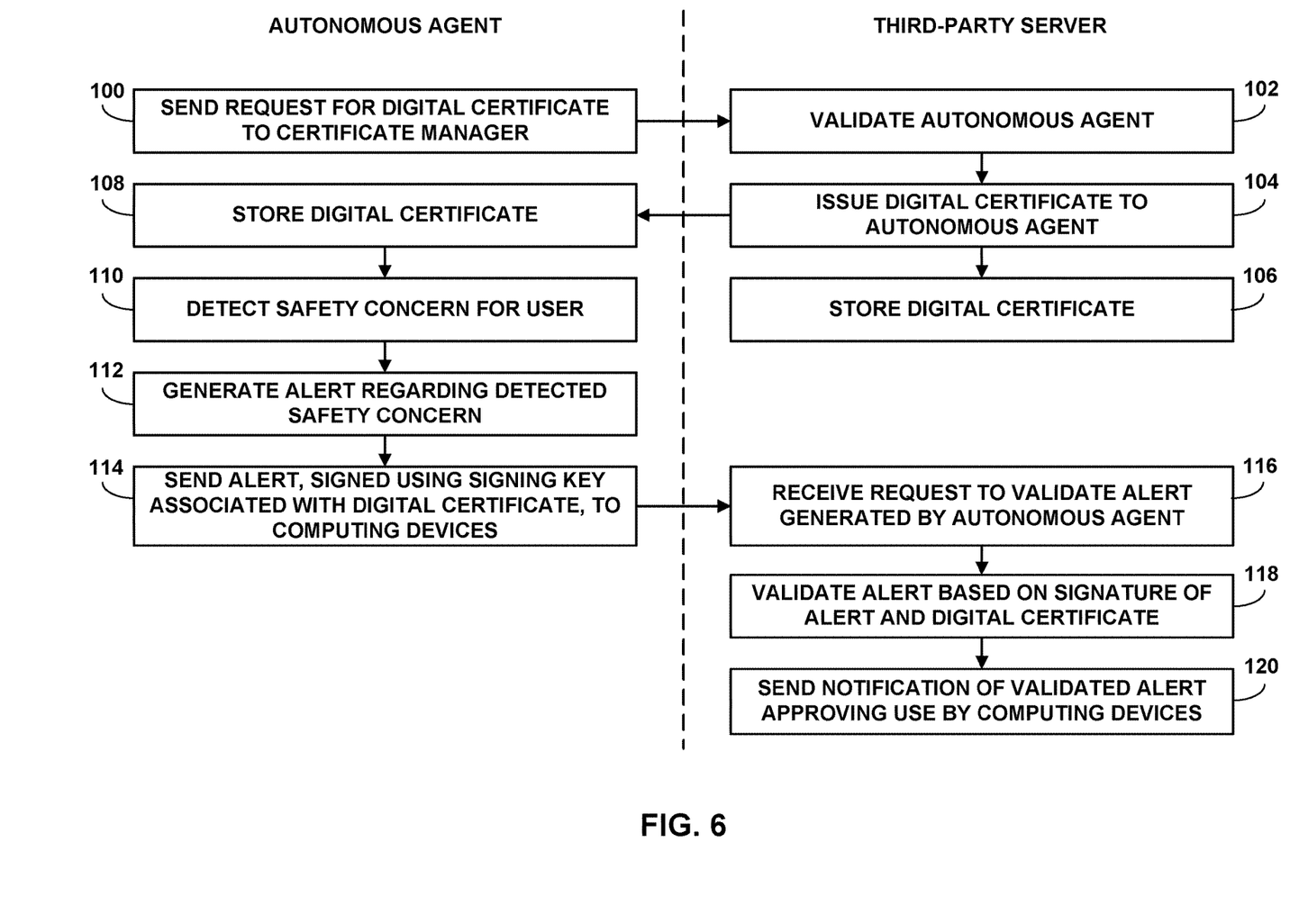
FIG. 6 is a flowchart illustrating an example operation of automatically generating and validating a user safety alert for distribution, in accordance with the techniques of this disclosure.

FIG. 6 is a flowchart illustrating an example operation of automatically generating and validating a user safety alert for distribution, in accordance with the techniques of this disclosure. The example operation of FIG. 6 is described with respect to autonomous agent computing device 12 and third-party server device 20 from FIG. 1. In other examples, the operation of FIG. 6 may also be performed by autonomous agent computing device 60 from FIG. 3 and third-party server device 80 from FIG. 4.

Autonomous agent 12 sends a request for a digital certificate to certificate manager 22 of third-party server 20 (100). In response to the request, certificate manager 22 authenticates autonomous agent 12 (102) and issues the digital certificate to autonomous agent 12 (104). The digital certificate issued by certificate manager 22 verifies the identity of autonomous agent 12 and includes a public key. Certificate manager 22 also stores the digital certificate for autonomous agent 12 (106).

Upon receipt of the digital certificate from certificate manager 22 of third-party server 20, autonomous agent 12 stores the digital certificate (108). As described in more detail above, autonomous agent 12 is configured to detect a safety concern for a user of autonomous agent 12 (110). For example, autonomous agent 12 may track information related to a user's location and behavior, and detect the safety concern for the user based on the tracked information. Upon detecting the safety concern for the user, autonomous agent 12 generates an alert regarding the detected safety concern (112), and sends the alert, signed using a private signing key associated with the digital certificate, destined for one or more computing devices associated with the user, e.g., user mobile device 14 and/or contact devices 16 (114).

In some examples, the alert may first be received by service provider device 11 associated with an Internet or mobile phone service provider associated with the one or more destination computing devices. According to the techniques of this disclosure, service provider device 11 may request validation of the received alert prior to further transmitting the alert to the one or more destination computing devices to ensure that the alert is coming from a known, trusted source. In other examples, any of the destination computing devices, e.g., user mobile device 14 or contact devices 16, may request validation of the received alert prior to accepting or processing the alert.

In either of the above examples, third-party server 20 receives a request to validate the alert generated by autonomous agent 12 (116). In response to the request, alert validation unit 24 of third-party server 20 validates the alert based on the digital signature of the alert and the digital certificate of autonomous agent 12 (118). More specifically, alert validation unit 24 matches the digital signature of the alert to the public key associated with the digital certificate of autonomous agent 12 stored in a key database of third-party network 18 to verify the identity of the computing device, e.g., autonomous agent 12, that generated the alert. Alert validation unit 24 then sends a notification of the validated alert to either service provider device 11 or the one or more destination computing devices 14, 16 approving use of the validated alert by the destination computing devices 14, 16 (120). In one example, alert validation unit 24 may send the notification of the validated alert to service provider device 11 approving further transmission of the validated alert to the one or more destination computing devices 14, 16. In another example, alert validation unit 24 may send the notification of the validated alert to one of the destination computing devices 14, 16 approving presentation of the validated alert by the one of the destination computing devices 14, 16.

Although described herein as primarily using PKI and digital certificates to verify the identity of autonomous agent 12 and, thus, validate alerts generated by autonomous agent 12, in other examples, the system described in this disclosure may apply other methods of authentication and authorization for the purpose of verifying the identity of autonomous agent 12. In some cases, autonomous agent 12 and/or third-party network 18 may leverage artificial intelligence (AI) capabilities to continually learn and update their security techniques. For example, autonomous agent 12 and/or third-party network 18 may automatically learn of next generation PKI schemes or other new validation schemes, and automatically implement such schemes to replace the use of PKI and digital certificates to validate alerts generated by autonomous agent 12.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some cases, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a mobile computing device, a wearable computing device, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A third-party server comprising:
 a memory; and
 one or more processors in communication with the memory and configured to:
   receive a request to validate an alert generated by an autonomous agent regarding a detected safety concern for a user, wherein the alert includes a digital signature associated with a digital certificate of the autonomous agent;
   validate the alert based on the digital signature of the alert and the digital certificate of the autonomous agent; and
   send a notification of the validated alert approving use of the validated alert by one or more computing devices associated with the user.

2. The third-party server of claim 1, wherein the one or more processors are configured to:

receive the request to validate the alert generated by the autonomous agent from a service provider computing device of a service provider for the one or more computing devices associated with the user; and
send the notification of the validated alert to the service provider computing device approving further transmission of the validated alert to the one or more computing devices associated with the user.

3. The third-party server of claim 1, wherein the one or more processors are configured to:
receive the request to validate the alert generated by the autonomous agent from one of the computing devices associated with the user; and
send the notification of the validated alert to the one of the computing devices associated with the user approving presentation of the validated alert by the one of the computing devices associated with the user.

4. The third-party server of claim 1, wherein the request to validate the alert generated by the autonomous agent comprises a first request, and wherein the one or more processors are configured to:
receive a second request for the digital certificate from the autonomous agent;
authenticate the autonomous agent;
issue the digital certificate to the autonomous agent, wherein the digital certificate binds a public key of a public-private key pair of the autonomous agent with an identity of the autonomous agent; and
store the public key along with the digital certificate of the autonomous agent in a key database.

5. The third-party server of claim 4, wherein the second request for the digital certificate includes the identity of the autonomous agent and the public key of the autonomous agent, and wherein to authenticate the autonomous agent, the one or more processors are configured to facilitate registration of the autonomous agent with a registration authority of a third-party network based on the identity of the autonomous agent.

6. The third-party server of claim 5, wherein to issue the digital certificate to the autonomous agent, the one or more processors are configured to:
in response to the registration of the autonomous agent with the registration authority, receive the digital certificate of the autonomous agent generated by a certificate authority of the third-party network; and
send the digital certificate to the autonomous agent.

7. The third-party server of claim 4, wherein the digital signature of the alert comprises a private key of the public-private key pair of the autonomous agent, and wherein to validate the alert, the one or more processors are configured to:
match the private key of the digital signature of the alert to the public key associated with the digital certificate of the autonomous agent stored in the key database; and
based on the match, verify the identity of the autonomous agent that generated the alert.

8. The third-party service of claim 1, wherein, to validate the alert, the one or more processors are configured to determine that the digital certificate of the autonomous agent is not revoked.

9. The third-party server of claim 1, wherein the validated alert approved for use by the one or more computing devices associated with the user comprises a request for confirmation that the user is safe.

10. The third-party service of claim 1, wherein the validated alert approved for use by the one or more computing devices associated with the user comprises a notification of the detected safety concern for the user that provides at least geolocation information of the user.

11. A computer-based method comprising:
receiving, by a third-party server, a request to validate an alert generated by an autonomous agent regarding a detected safety concern for a user, wherein the alert includes a digital signature associated with a digital certificate of the autonomous agent;
validating, by the third-party server, the alert based on the digital signature of the alert and the digital certificate of the autonomous agent; and
sending, by the third-party server, a notification of the validated alert approving use of the validated alert by one or more computing devices associated with the user.

12. The method of claim 11, wherein the request to validate the alert generated by the autonomous agent is received from a service provider computing device of a service provider for the one or more computing devices associated with the user, and wherein sending the notification of the validated alert comprises sending the notification of the validated alert to the service provider computing device approving further transmission of the validated alert to the one or more computing devices associated with the user.

13. The method of claim 11, wherein the request to validate the alert generated by the autonomous agent is received from one of the computing devices associated with the user, and wherein sending the notification of the validated alert comprises sending the notification of the validated alert to the one of the computing devices associated with the user approving presentation of the validated alert by the one of the computing devices associated with the user.

14. The method of claim 11, wherein the request to validate the alert generated by the autonomous agent comprises a first request, the method further comprising:
receiving, by the third-party server, a second request for the digital certificate from the autonomous agent;
authenticating, by the third-party server, the autonomous agent;
issuing, by the third-party server, the digital certificate to the autonomous agent, wherein the digital certificate binds a public key of a public-private key pair of the autonomous agent with an identity of the autonomous agent; and
storing, by the third-party server, the public key along with the digital certificate of the autonomous agent in a key database.

15. The method of claim 14, wherein the second request for the digital certificate includes the identity of the autonomous agent and the public key of the autonomous agent, and wherein authenticating the autonomous agent comprises facilitating registration of the autonomous agent with a registration authority of a third-party network based on the identity of the autonomous agent.

16. The method of claim 15, wherein issuing the digital certificate to the autonomous agent comprises:
in response to the registration of the autonomous agent with the registration authority, receiving the digital certificate of the autonomous agent generated by a certificate authority of the third-party network; and
sending the digital certificate to the autonomous agent.

17. The method of claim 14, wherein the digital signature of the alert comprises a private key of the public-private key pair of the autonomous agent, and wherein validating the alert comprises:

matching the private key of the digital signature of the alert to the public key associated with the digital certificate of the autonomous agent stored in the key database; and based on the match, verifying the identity of the autonomous agent that generated the alert.

18. The method of claim 11, wherein validating the alert comprises determining that the digital certificate of the autonomous agent is not revoked.

19. A computer-based method comprising:

detecting, by an autonomous agent computing device, a safety concern for a user of the autonomous agent computing device;

generating, by the autonomous agent computing device, an alert regarding the detected safety concern;

sending, by the autonomous agent computing device, the alert destined for one or more computing devices associated with the user, wherein the alert includes a digital signature associated with a digital certificate of the autonomous agent computing device;

validating, by a third-party server, the alert based on the digital signature of the alert and the digital certificate of the autonomous agent computing device;

sending, by the third-party server, a notification of the validated alert approving use of the validated alert by the one or more computing devices associated with the user; and receiving, by the one or more computing devices associated with the user, the validated alert.

* * * * *